United States Patent [19]
Choi

[11] Patent Number: 5,327,233
[45] Date of Patent: Jul. 5, 1994

[54] MOVABLE SECURITY CAMERA APPARATUS

[75] Inventor: Seung L. Choi, Suweon, Rep. of Korea

[73] Assignee: SamSung Electronics, Ltd., Suwon, Rep. of Korea

[21] Appl. No.: 760,193

[22] Filed: Sep. 16, 1991

[30] Foreign Application Priority Data

Dec. 15, 1990 [KR] Rep. of Korea ............ 90-20717

[51] Int. Cl.$^5$ .................... H04N 7/00; H04N 7/18
[52] U.S. Cl. ............................. 348/152; 348/119
[58] Field of Search .................. 358/108, 93, 103

[56] References Cited

U.S. PATENT DOCUMENTS

| | | | |
|---|---|---|---|
| 3,935,380 | 1/1976 | Coutta | 358/108 |
| 4,027,329 | 5/1977 | Coutta | 358/108 |
| 4,272,781 | 6/1981 | Taguchi et al. | 358/108 |
| 4,278,142 | 7/1981 | Kono | 358/103 |
| 4,326,218 | 4/1982 | Coutta et al. | 358/108 |
| 4,790,402 | 12/1988 | Field et al. | 358/103 |
| 4,811,227 | 3/1989 | Wikström | 358/103 |
| 4,862,047 | 8/1989 | Suzuki et al. | 358/103 |
| 5,051,906 | 9/1991 | Evans, Jr. et al. | 358/103 |
| 5,075,772 | 12/1991 | Gebel | 358/93 |

*Primary Examiner*—John K. Peng
*Attorney, Agent, or Firm*—Robert E. Bushnell

[57] ABSTRACT

A movable security camera apparatus for providing visual security with minimal human effort, error and equipment expense, includes a MICOM, a path input section, a sensing section, a sensor detecting section, a camera video tape recording section, and a main driving section. The MICOM controls the whole system, including the motion of a watch camera on the basis of control programs in accordance with inputted path information. The sensing section provides the data for the moving direction of the camera, the data being obtained when sensors of a rail are controlled by the path commands of the MICOM.

27 Claims, 4 Drawing Sheets

MOVABLE SECURITY CAMERA APPARATUS

FIELD OF THE INVENTION

The present invention relates to a movable security camera apparatus, and more particularly to, a camera apparatus in which a series of control programs control a video camera recorder so as to move it automatically along a rail of a certain track contour and to perform photographings, and a series of the photographings are recorded, thereby making it possible to guard a certain area with a single camera.

BACKGROUND OF THE INVENTION

Generally, many public facilities such as banks, department stores and prisons are guarded by patrolling cars at intervals of certain periods. However, such a guarding method is not efficient enough to prevent or detect crimes and other accidents.

Such a guarding method depends on human efforts and, therefore, the carelessness and mistakes of the patrolling persons can fail to notice a problem. Thus, an intruder who well knows the situation of the watched area can escape the detection of the patrolling persons. Consequently, many accidents are still generated and the loss of property occurs.

In order to overcome the above described problems of the human watch method, a recently developed new guarding and security system includes a closed circuit provided with a camera or the like for detecting objects plus a monitor capable of displaying the watched area to allow quick warning and action following an accident such as a fire, or an intrusion.

However, such a guarding system requires a large number of cameras to be installed at critical places in the watched area to the need for such a large number of cameras increases the cost of the guarding system. Cost is also increased by, expensive recording apparatus and a plurality of video tapes for recording the data photographed by the watching cameras.

SUMMARY OF THE INVENTION

The present invention is intended to overcome the above described disadvantages of the conventional apparatus.

Therefore, it is the object of the present invention to provide a movable security camera in which a control program controls a single or small number of cameras so as to automatically move them along a rail track, thereby making it possible to guard a whole area.

In achieving the above object, the movable security camera apparatus according to the present invention comprises a MICOM (microcomputer) for controlling the apparatus including the motion of a security camera on the basis of a control program in response to an input path information, a path input section for inputting the moving path information for the security camera to the MICOM, a sensing section for selectively turning on or off respective sensors disposed on a rail according to the path commands from the MICOM, a sensor detecting section for detecting the moving path of the security camera by sensing the states of the sensors of the sensing section, a camera VCR (Video Cassette tape Recording) section including a security camera for photographing the guarding area by moving through the area along the rail according to the path commands from the MICOM and a VCR for recording intermittently or continuously the photographed information of the security camera, and a main driving section for supplying a driving power to the camera VCR section and for driving and shifting the moving direction of the security camera according to the output of the sensor detecting section.

BRIEF DESCRIPTION OF THE DRAWINGS

The above object and other advantages of the present invention will become more apparent from the description of the preferred embodiment of the present invention with reference to the attached drawings in which.

DESCRIPTION OF THE PREFERRED EMBODIMENT

Figure 1:
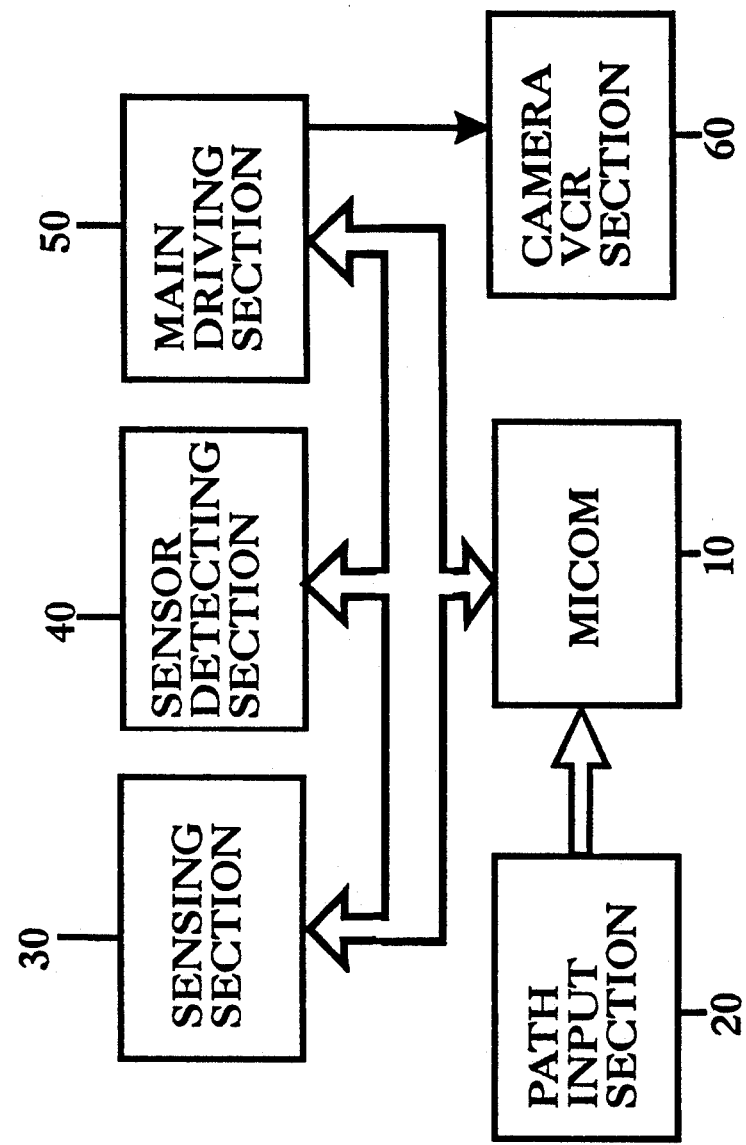
FIG. 1 is a block diagram showing the constitution of the movable security camera apparatus according to the present invention.

FIG. 1 is a block diagram showing the constitution of the movable security camera apparatus according to the present invention. As shown in FIG. 1a MICOM 10 controls the whole system on the basis of control programs, and the output terminal of a path inputting section 20 which inputs moving paths of the camera is connected to the MICOM 10. The MICOM 10 is connected to a sensing section 30, and the sensing section 30 turns on or off a plurality of sensors 31 which are installed at certain intervals on the rail.

The outputs of the sensing section 30 are detected by a sensor detecting section 40, and the outputs of the sensor detecting section 40 are supplied to a main driving section 50 for driving a motor. The main driving section 50 turns on or off a camera VCR section 60. The camera VCR section 50 records the photographed data for the area to be guarded. The main driving section 50 drives the camera VCR section 60 and a motor for moving the camera in the forward or reverse direction.

Figure 2:
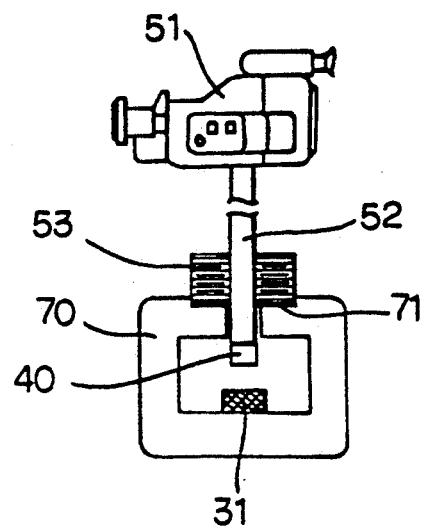
FIG. 2 illustrates the constitutions of the rail and video camera recorder of the movable security camera apparatus according to the present invention.

FIG. 2 illustrates an embodiment of the mechanism of the movable security camera apparatus according to the present invention. As shown in FIG. 2, a mounting pole 52 for the security camera (video camera recorder) 51 is provided with sensor detecting means which is installed at the lower part thereof thereby forming the sensor detecting section 40 as shown in FIG. 1.

Further, sensors 31 of the sensing section 30 are installed on the inner bottom of a rail 70 in such a manner that the sensors 31 and the sensor detecting section 40 of the mounting pole 52 should face each other. Further, a plurality of driving gears 53 are installed on the lower part of the mounting pole 52, and spur gears 71 are formed on the opposite sides of the rail 70 so as to be meshed with the driving gears 53, thereby moving the driving gears 53 along with the spur gears 71 of the rail 70.

Figure 3:
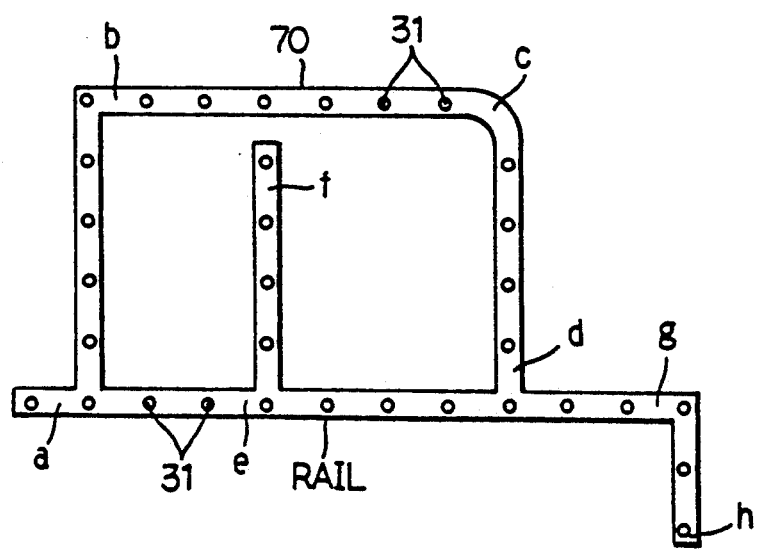
FIG. 3 illustrates the installation of the rail of the movable security camera apparatus according to the present invention.

FIG. 3 illustrates such an installed state of the rail 70. As shown in FIG. 3, a plurality of sensors 31 are respectively installed between points a–h.

In the case where such a track is adopted, the moving paths for the watch camera 51 can be varied as follows.

| | |
|---|---|
| Path 1: | points a-b-c-d-e-a |
| Path 2: | points a-e-f-e-d-g-h |
| . | |
| . | |
| Path N: | points a-b-c-d-g-h-g-d-c-b-a |

Therefore, the moving paths for the watch camera 1, 2, 3, . . . N are selectively inputted into the MICOM 10 and, thus, the paths for the security camera 51 are succeeded in accordance with the sequence of the programs of the MICOM 10.

The camera apparatus of the present invention constituted as above will now be described as to its operations and effects referring to FIG. 4.

At the start, the MICOM 10 decides as to whether there is an input for the path from the path input section 20 (step 110) so that in the absence of such an input, the camera 51 is led to its usual moving loop which is set in advance (step 120). On the other hand, in the presence of such an input, the input of the path input section 20 applied to the MICOM 10 (step 130) so that the MICOM 10 controls the sensing section 30 according to the input so as to turn on or off the sensors 31 installed on the rail 70 respectively and to move the watch camera 51 along the inputted path (step 140).

Thereafter, the MICOM 10 drives the main driving section 50, so that the camera VCR section 60 is turned on, and that the watch camera 51 is activated photograph. At the same time, the motor is driven so as to move the security camera 51 (step 150), and the data photographed by the security camera 51 is recorded by its VCR section (step 160). As shown in FIG. 2, the security camera 51 moves along the rail 70 by a plurality of the driving gears 53 which are driven by a motor (not shown) and meshed with the spur gear 71 formed on the rail 70.

Under this condition, whether the security camera 51 should continuously move or should change the track is decided in accordance with the states of the sensors 31 installed on the rail 70, i.e., the turned on or off states of the sensors 31. The states of the sensors 31 are controlled by the MICOM 10 in accordance with the path information inputted from the path input section 20.

Further, when the security camera 51 passes the sensors 31, if the mounting pole 52 of the camera is positioned vertically upon the sensors 31, the sensor detecting section 40 installed on the lower part of the mounting pole 52 generates a sensing signal to read a track changing signal. Then the main driving section 50 drives the motor in the forward or reverse direction for adjusting the moving direction of the security camera 51.

In that case, the sensor detecting means utilizes a F/V converter (frequency-to-voltage converter) to make the respective sensor 31 of the sensing section 30 generate commands for straight advancement, left and right turns and reverse advancement in different frequencies. At the same time, the sensor detecting section 40 detects the frequencies outputted from the sensors 31, and supplies them as data for the motion of the camera.

Furthermore, when the camera comes to the position directly above a sensor 31 which generates direction changing signals, the signals are detected by means of a proximity switch. Some other techniques which are not described in the present invention might be used.

Thus, the security camera 51 moves along the inputted moving paths, takes photographs, and records the photographed data, until arriving at the end of the rail 70, where a discrimination is made as to whether the camera 51 has arrived at the end of the rail (step 170), and then the movement of the security camera 51 is reversed in the opposite direction (step 180).

If the discrimination shows that it has not arrived at the end of the rail 70 yet, the security camera 51 continuously moves and, thereafter, the discrimination is made again as to whether it has arrived at the end of the path (step 190). If it is not the end of the path, a return to the step 170 is made, while, if it is the end of the path, a return is made to the step 110 where a discrimination is made as to whether a new path is to be inputted.

According to the result of the discrimination, if there is no new path input the preset normal state (step 120) is restored, and if there is a new path input, then the steps from 130 to 190 are repeated.

Meanwhile, the normal state can be selectively set by the user, for example, one of the above mentioned paths is carried out or the driving of the whole system can be terminated in the normal state.

Thus, if the moving paths for the watch camera 51 are set by the path input section 20 in advance, the security camera 51 moves to carry out the steps successively in accordance with the sequence of the inputted paths (inputted into the MICOM 10) and, therefore, it becomes impossible for a third party to predict the moving direction of the camera.

Moreover, in the case where the guarding area is very extensive, the recording can be carried out intermittently at a predetermined interval during the movement of the security camera, so that then the consumption of the recording tape can be saved.

Figure 4:
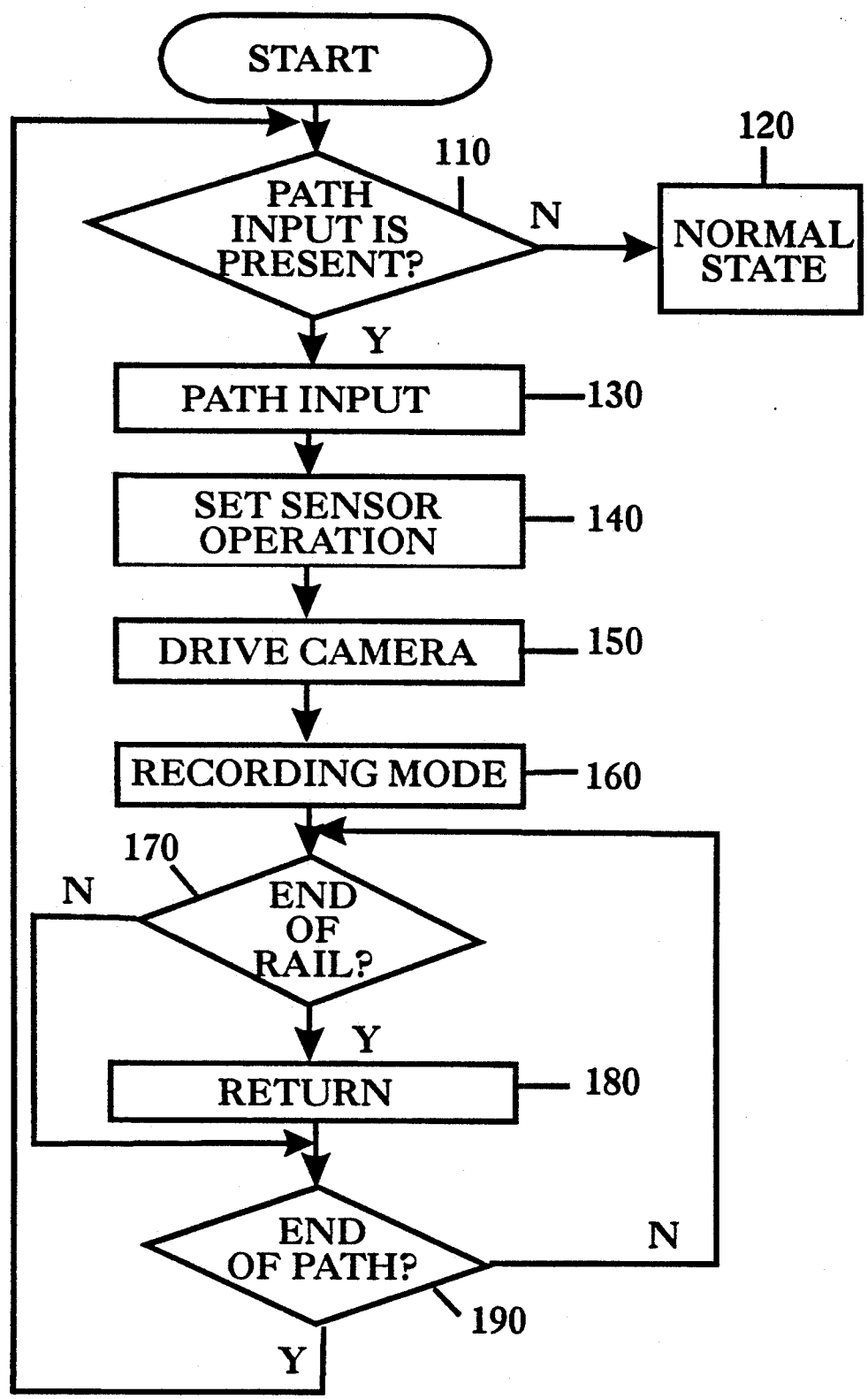
FIG. 4 is a flow chart showing the operation of the movable security camera apparatus according to the present invention.

If the recordings are intermittenly made, the recording-on and recording-off times should be set at the step 160 under the recording mode as shown in FIG. 4.

Figure 5:
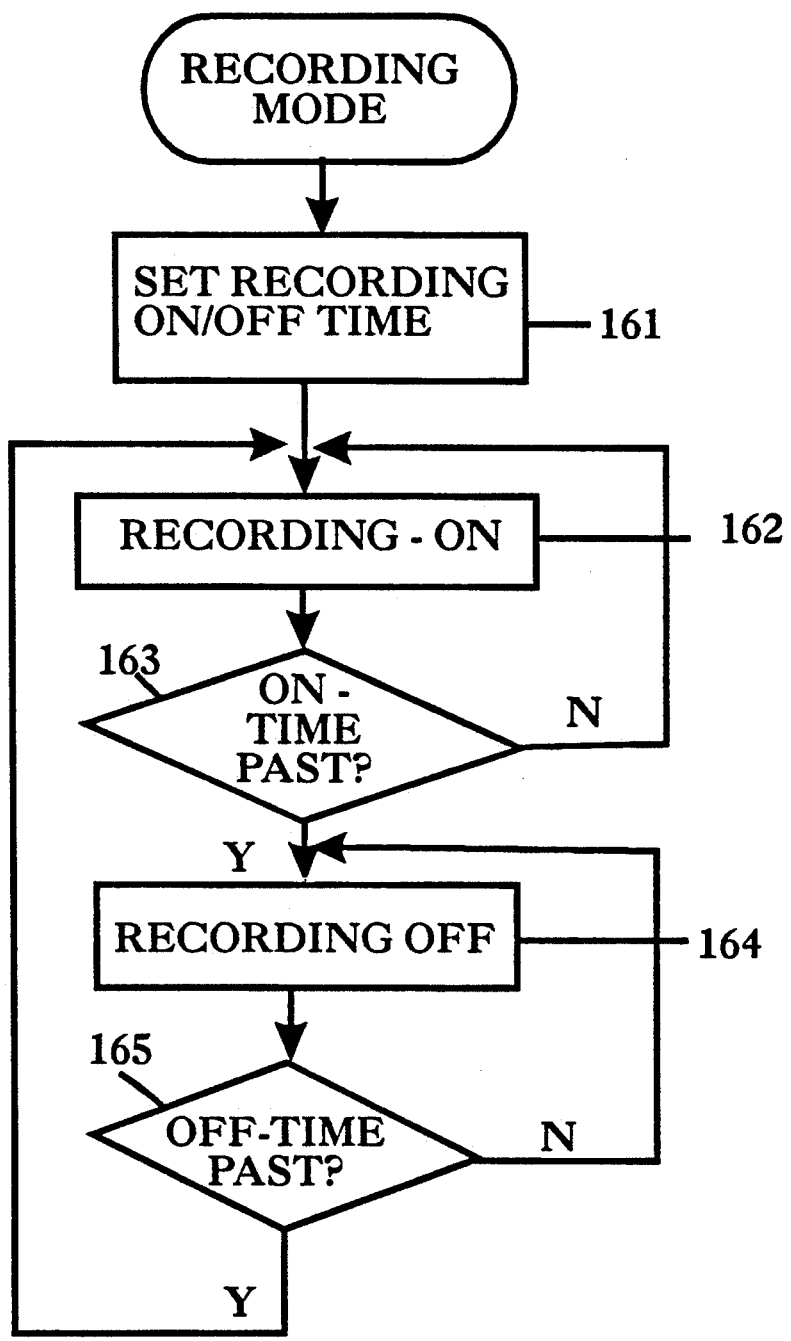
FIG. 5 is a flow chart showing the operation of the recording mode in FIG. 4.

That is, in setting the recording times as shown in FIG. 5, the recording on-and-off times are set (step 161), and the recording mode is turned on to record the photographed data of the watch camera 51 on the tape (step 162). Then a discrimination is made as to whether the recording-on time has elapsed off (step 163). If it is found that the recording-on time has not been elapsed yet, then the mode of recording-on is maintained further while checking the elapse thereof.

If the recording-on time has elapsed off, the recording mode is turned off (step 164), so that the photographed data of the security camera 51 is not be recorded any more and the user can guard only through the monitor.

According to the present invention as described above, the security camera moves along the rail of a predetermined track contour to extensively watch the area to be guarded. Further, the moving paths for the security camera for taking the photographs are variously provided so that all the corners of the place to be guarded can be watched without omissions, and that more important places can be more frequently watched by adjusting the paths.

Accordingly, the present invention eliminates the waste of the human efforts in comparison with the case of alternate patrollings by the patrolling guards at a certain interval, and even a wide area can be guarded efficiently by means of a single camera or a small number of cameras, thereby the apparatus being economically operated.

Also, the guarding errors due to the carelessness and mistakes of the patrols can be prevented sufficiently. Furthermore, if the watch camera is provided to pivot left and right, then the watch is not limited to one direction during the movement of the security camera, but extended to all directions, thereby doubling the guarding effect.

What is claimed is:

1. A movable watch camera apparatus comprising:
    a MICOM for controlling the whole system and for controlling the motion of a watch camera on the basis of control programs in accordance with inputted moving path information;
    a path input section for inputting into said MICOM the moving path information for said watch camera;
    a sensing section for providing the data for the moving direction of said camera, after sensors on a rail are controlled by path commands of said MICOM;
    a sensor detecting section for detecting the moving path of said watch camera by sensing the states of said sensors of said sensing section;
    a camera video cassette tape recording section including said watch camera and a video cassette tape recorder;
    said watch camera being for taking photographs over the area to be guarded by moving along said rail; and
    said video cassette tape recorder, being for recording the photographed data of said watch camera intermittently or continuously in accordance with the controls of said MICOM; and
    a main driving section for supplying driving power to said camera video cassette tape recording section, and for driving said watch camera or changing the moving direction of said watch camera according to the output of said sensor detecting section.

2. The movable watch camera apparatus as claimed in claim 1, wherein the control program of said MICOM comprises the steps of:
    discriminating as to whether an input for the moving path of said watch camera is inputted;
    returning to a preset normal state in the absence of the path input;
    setting the operations of said sensors of said sensing section, and driving a motor and said watch camera in the presence of the path input;
    carrying out a recording mode to record photographed data of said watch camera;
    discriminating as to whether said watch camera is positioned at the end of said rail after carrying out the recording mode;
    reversing the moving direction of said watch camera if said watch camera is positioned at the end of said rail; and
    discriminating as to whether said watch camera is positioned at the end of the path after reversing the moving direction.

3. The movable watch camera apparatus as claimed in claim 2, wherein said recording mode comprises the steps of:
    setting recording-on and recording-off times;
    checking the elapse during the recording-on time after turning on the recording mode; and
    turning off the recording mode when the recording-on time, elapsed and turning on the recording mode to repeat after the recording-off time elapsed.

4. The movable watch camera apparatus as claimed in claim 1, wherein said camera video cassette tape recording section comprises sensor detection means, and camera moving means including a driving gear, said driving gear being installed on the lower part of a mounting pole for mounting said watch camera.

5. The movable watch camera apparatus as claimed in claim 4, wherein said camera moving means comprises a spur gear disposed on said rail to be meshed with said driving gear of said mounting pole.

6. The movable watch camera apparatus as claimed in claim 4, wherein said rail is provided with a plurality of sensors in a predetermined interval on the inner bottom thereof.

7. The movable watch camera apparatus as claimed in claim 4, wherein said sensor detecting means utilizes a F/V converter.

8. The movable watch camera apparatus as claimed in claim 4, wherein said sensor detecting means comprises of a proximity switch.

9. A movable security camera apparatus, comprising:
    path input means for providing path data of a security camera moving along a path on a rail;
    sensing means for providing sensing data of a plurality of sensors located on the rail in conjunction with the movement of the security camera along the rail;
    sensor detecting means for detecting the path in accordance with the sensing data;
    microcomputing means for controlling the apparatus in accordance with the path data, sensing data, and detected path;
    video means for video monitoring and video recording an area determined by the movement of the security camera; and
    driving means for driving said video means and driving a motor for moving said security camera along the path.

10. The movable security camera apparatus as claimed in claim 9, wherein a control program of said microcomputing means comprises the steps of:
    discriminating whether path data is available;
    returning to a preset normal state in the absence of path data;
    setting sensor states and driving said security camera in the presence of path data;
    selectively monitoring and recording video data;
    determining whether said security camera is positioned at an end of said rail;
    reversing a moving direction of said security camera when said security camera is positioned at the end of the rail;
    deciding whether said security camera is positioned at an end of the path;
    if said video camera is at the end of the path, terminating the method; and
    if said video camera is not at the end of the path, returning to the determining step.

11. The movable security camera apparatus as claimed in claim 10, wherein said selectively monitoring and recording step comprises the steps of:
    setting a recording-on and a recording-off time;
    starting recording at the recording-on time;
    checking the time elapsed from the recording-on time; and ending recording according to the elapsed time.

12. The movable security camera apparatus as claimed in claim 9, wherein said security camera further comprises a driving gear mounted on a lower part of a pole securing the security camera.

13. The movable security camera apparatus as claimed in claim 12, further comprising a spur gear mounted on the rail to be meshed with the driving gear.

14. The movable security camera apparatus as claimed in claim 12, further comprised of said plurality of sensors being located on an inner bottom of the rail at predetermined intervals.

15. The movable security camera apparatus as claimed in claim 12, wherein said sensor detecting means further comprises a frequency to voltage converter.

16. The movable security camera apparatus as claimed in claim 12, wherein said sensor detecting means further comprises a proximity switch.

17. A movable security camera system comprising:
a video camera mounted on one end of a mounting piece engaged with a rail, said video camera being movable on the rail along a predetermined path, and said video camera comprising video monitoring means for monitoring photographed data of an area adjacent to the rail;
sensing means, attached to another end of the mounting piece, for providing sensing data in response to the movement of the video camera on the rail;
driving means for driving the video camera, and for providing said movement of the video camera, mounting piece and sensing means; and
microcomputing means for controlling and monitoring the system in accordance with said sensing data and a software program.

18. The movable security camera system as claimed in claim 17, wherein the video camera further comprises video recording means for recording said photographed data of the area.

19. A movable video security system comprising:
monitoring means for monitoring video data of an area adjacent to a rail;
sensing means, connected to said monitoring means via a mounting section, for sensing movement of the monitoring means by sensing a positional sensor on the rail; and
means for controlling the monitoring means in response to said sensed positional sensor.

20. The movable video security system as claimed in claim 19, wherein the means for controlling comprises a microcomputer.

21. The movable video security system as claimed in claim 19, wherein the monitoring means further comprises means for recording video data.

22. The movable video security system as claimed in claim 21, wherein the means for recording further comprises a video cassette recorder.

23. A method of a security system comprising the steps of:
monitoring video data of an area adjacent to a rail using a video camera;
sensing a positional sensor on the rail corresponding to a position of the video camera; and
moving said video camera along the rail in response to said positional sensor being sensed.

24. The method of claim 23 further comprising the step of recording said monitored video data.

25. The method of claim 23 further comprising the step of controlling a predetermined movement path of the video camera in response to a program in a controller.

26. The method of claim 25 wherein said program comprises the steps of:
discriminating whether path data is available, corresponding to a path of the movement of the video camera along the rail;
returning to a preset normal state in the absence of said path data;
setting a state of the positional sensor and driving said video camera in the presence of said path data;
selectively monitoring and recording video data;
determining whether said video camera is positioned at an end of said rail;
reversing a moving direction of said video camera when said video camera is positioned at the end of the rail;
deciding whether said video camera is positioned at an end of the path;
if said video camera is at the end of the path, terminating the method; and
if said video camera is not at the end of the path, returning to the determining step.

27. The movable security camera apparatus as claimed in claim 26, wherein said selectively monitoring and recording step comprises, in a recording mode, the steps of:
setting a recording-on and a recording-off time;
starting recording at the recording-on time;
checking the time elapsed from the recording-on time; and ending recording according to the elapsed time.

* * * * *

UNITED STATES PATENT AND TRADEMARK OFFICE
CERTIFICATE OF CORRECTION

PATENT NO. : 5,327,233
DATED : July 5, 1994
INVENTOR(S) : Seung L. Choi

It is certified that error appears in the above-indentified patent and that said Letters Patent is hereby corrected as shown below:

Column 1,    Line 36,    Insert --.-- after "area", Capitalize "the" to
                         --The--, Delete "to";

Column 3,    Line 33,    Insert --to-- before photograph.

Signed and Sealed this

Twenty-second Day of November, 1994

Attest:

BRUCE LEHMAN

*Attesting Officer*    *Commissioner of Patents and Trademarks*